(12) United States Patent
Raven et al.

(10) Patent No.: US 11,084,710 B1
(45) Date of Patent: Aug. 10, 2021

(54) REFUELING TOOL AND QUICK DISCONNECT

(71) Applicant: United States of America as represented by the Administrator of NASA, Washington, DC (US)

(72) Inventors: Hans R. Raven, Laurel, MD (US); Matthew S. Ashmore, Woodbine, MD (US); Matthew Sammons, Arlington, VA (US); Patrick A. O'Neill, Laurel, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 233 days.

(21) Appl. No.: 16/141,660

(22) Filed: Sep. 25, 2018

(51) Int. Cl.
  *B67D 7/06* (2010.01)
  *F16L 37/40* (2006.01)
  *B64G 4/00* (2006.01)
  *B64G 1/10* (2006.01)

(52) U.S. Cl.
  CPC .......... *B67D 7/06* (2013.01); *B64G 1/1078* (2013.01); *B64G 4/00* (2013.01); *F16L 37/40* (2013.01); *B64G 2004/005* (2013.01)

(58) Field of Classification Search
  CPC .......... B67D 7/06; B64G 1/1078; B64G 4/00; B64G 2004/005; F16L 37/40
  See application file for complete search history.

(56) References Cited

U.S. PATENT DOCUMENTS

| 8,006,938 B2 * | 8/2011 | Behrens | B64G 1/1078 |
| | | | 244/172.5 |
| 8,181,911 B1 * | 5/2012 | Gryniewski | B64G 1/402 |
| | | | 244/172.5 |
| 9,260,206 B2 * | 2/2016 | Allen | B64G 1/64 |
| 9,688,422 B2 * | 6/2017 | Roberts | B64G 4/00 |
| 9,950,424 B2 * | 4/2018 | Roberts | B25J 9/16 |
| 2012/0080563 A1 * | 4/2012 | Gryniewski | B64G 5/00 |
| | | | 244/172.5 |
| 2013/0153710 A1 * | 6/2013 | Roberts | B64G 1/1078 |
| | | | 244/172.5 |

FOREIGN PATENT DOCUMENTS

WO    WO-2012003258 A2 *  1/2012  ............. B64G 1/428

* cited by examiner

*Primary Examiner* — Brian M O'Hara
*Assistant Examiner* — Keith L Dixon
(74) *Attorney, Agent, or Firm* — Matthew F. Johnston; Bryan A. Geurts; Helen M. Gaius

(57) ABSTRACT

A quick disconnect apparatus including a first end configured to interface with a legacy fill and drain valve (FDV) of a satellite to be serviced, a second end configured to interface with a refueling tool, and a middle portion including at least one redundant seal to prevent unwanted fuel transfer during connection of the FDV and refueling tool.

9 Claims, 13 Drawing Sheets

REFUELING TOOL AND QUICK DISCONNECT

TECHNICAL FIELD

The invention relates generally to a connector between apparatuses for refueling purposes, and more particularly to a universal connector to be used for refueling in space satellite operations. U.S. application Ser. No. 15/957,514 filed on Apr. 19, 2018 entitled "AN OXIDIZER NOZZLE TOOL AND QUICK DISCONNECT SYSTEM FOR FUELING" is hereby incorporated herein by reference in its entirely.

SUMMARY

A brief summary of various embodiments is presented below. Some simplifications and omissions may be made in the following summary, which is intended to highlight and introduce some aspects of the various embodiments, but not to limit the scope of the invention. Detailed descriptions of embodiments adequate to allow those of ordinary skill in the art to make and use the inventive concepts will follow in later sections.

The rest of the Summary section will track the claims when finalized.

BRIEF DESCRIPTION OF THE DRAWINGS

Additional objects and features of the invention will be more readily apparent from the following detailed description and appended claims when taken in conjunction with the drawings. Although several embodiments are illustrated and described, like reference numerals identify like parts in each of the figures, in which:

DETAILED DESCRIPTION

Figure 1:
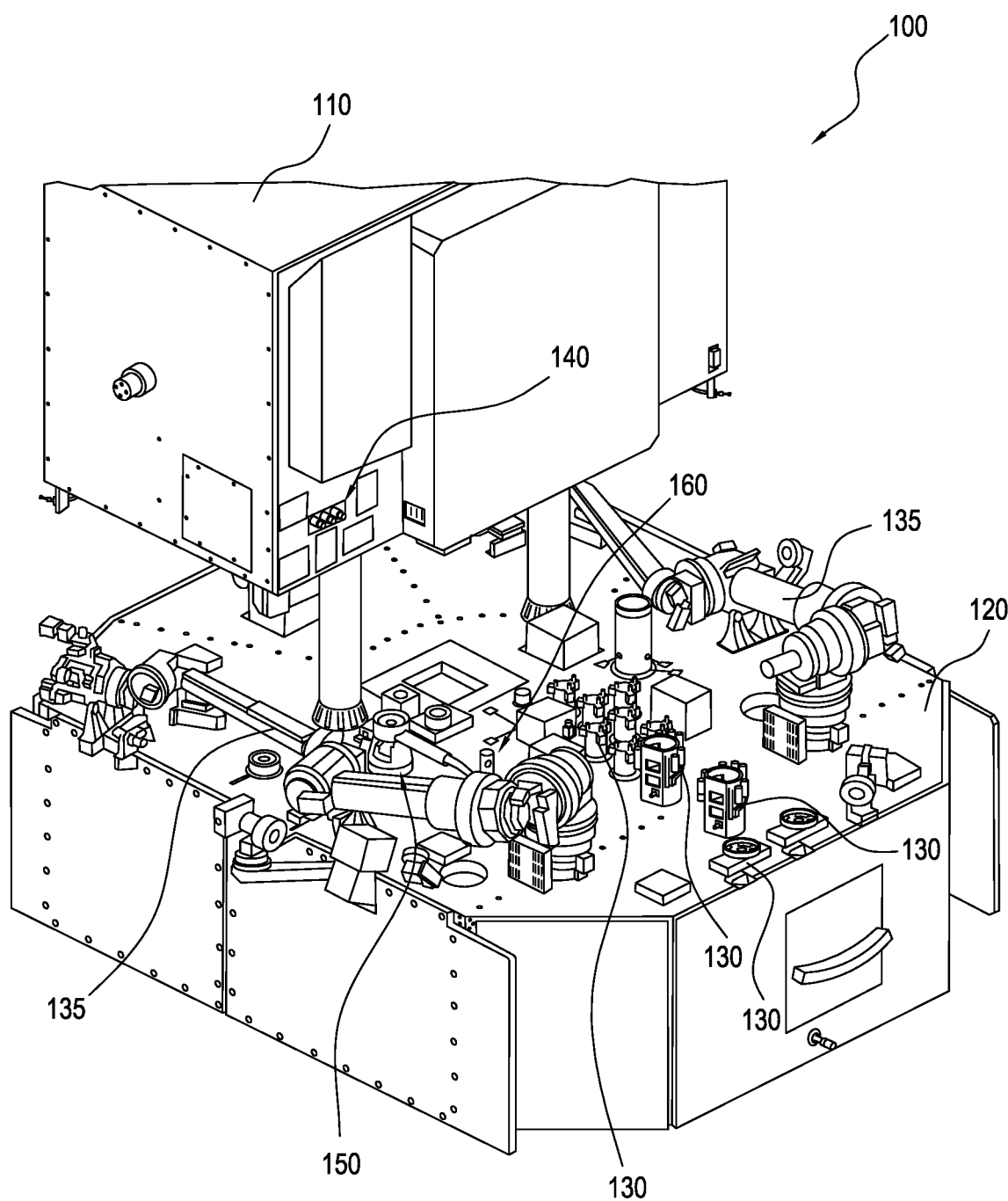
FIG. 1 illustrates an overview of a satellite servicing system in accordance with embodiments described herein.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable. Values such as maximum or minimum may be predetermined and set to different values based on the application. When steps of manufacture, process of using, or other method steps are described or claimed, the order of steps given is not constrained by the order presented, and may vary. Terms such as "below," "above," "right," and "left," may be used for relative orientation of a device or apparatus as illustrated in a figure. If an apparatus or component of a figure may be rotated and still function in a similar manner to what is described, the directional terms are not limited to the orientation illustrated in a particular figure. "Below" when rotated may become "right," or "left" or "above." The same holds true for the other directional indicators.

A potential, and likely, end-of-life event for a satellite is the depletion of propellant. Historically, satellites whose hardware and software components are still functioning properly will be decommissioned or de-orbited because the lack of onboard propellant does not permit proper spacecraft attitude and navigational control. Embodiments described herein present technology to service non-cooperative satellites, addressing the challenges presented by non-cooperative interfaces in order to access, interface, and manipulate non-cooperative assets.

Embodiments described herein facilitate on-orbit teleoperated robotic resupplying of media, such as propellants and pressurants, to a non-cooperative satellite. A non-cooperative satellite is a satellite that was not designed with on-orbit servicing in mind. Compared to a cooperative servicing interface, non-cooperative interfaces pose unique difficulties and challenges. While the current iteration is designed for satellite FDVs, the architecture and approach is extensible to other space assets that could be fueled/refueled on and off the ground, including but not limited to manned crew vehicles, planetary rovers, and space habitats. In the same vein, embodiments described herein are extensible to spacecraft propellants, pressurants, and other media beyond hypergolic fuels. For hypergol propellant transfers, a maximum expected operating pressure (MEOP) of 600 psig may be used.

Corrosive Media may be used with embodiments described herein. Three hypergolic propellants that may be used for refueling are hydrazine (N2H4), monomethyl hydrazine (MMH), and dinitrogen tetroxide (NTO). From a hardware perspective, hypergols can react with many elements in such a manner as to create ignition upon contact. For other elements, they have deleterious effects on the material integrity, limiting the component's operational life and functional capability.

A refueling tool may be used in combination with a quick-disconnect apparatus to refuel legacy satellites, such as the Client satellite, referred to above as non-cooperative satellites. Legacy satellites represent the bulk of satellites that have been launched and are presently in orbit. Most legacy satellites were manufactured to have a definite useful life without refueling. Embodiments described herein have developed apparatuses and methods to interface with and refuel these legacy satellites and extend the useful lives thereof.

Embodiments described herein include an interface from a robotic end effector capable of manipulating and interfacing to a Client system, such as a satellite, in order to transfer fuel to a Client assembly, such as a propulsion tank. The interface may allow for fuel or other media to pass from a propellant transfer system to the Client assembly. Most satellites are not constructed with fuel valves that are intended to be accessed, e.g. for refueling, subsequent to final pre-launch closeout. Satellite fill and drain valves (FDVs) are usually encased in several layers of protection and housing, which may include closeout caps on the valve itself, spacecraft structure, thermal insulation, etc., and the FDV remains permanently closed until the satellite reaches the end of its useful life, at which point it is typically decommissioned or de-orbited.

Embodiments described herein provide a way to acquire, seal to, and open and close the FDV in order to re-fuel a Client subsystem that was not designed or intended for refueling. Embodiments described herein provide a quick disconnect (QD) assembly that can attach to the FDV. After refueling using a robot arm and other tools, the QD assembly becomes a consumable left behind on the Client, which converts the original FDV to a cooperative servicing interface in order to facilitate additional servicing events in the future.

FIG. 1 illustrates a satellite servicing system 100 in accordance with embodiments described herein. The satellite servicing system 100 may include a Client satellite 110 to be serviced and a servicing payload 120. The illustrated configuration and shape of the Client satellite 110 is for explanatory purposes and does not limit the type of satellite that may be serviced by the servicing payload 120. The servicing payload 120 may be part of a stationary or moving assembly such as a servicing vehicle configured to service the Client satellite 110. When servicing the Client satellite 110, many operations may be performed to update, repair, or enhance the Client satellite 110. When the Client satellite 110 is acquired by the servicing vehicle, it becomes the "client."

Embodiments described herein discuss apparatuses and methods to refuel the Client satellite 110. The servicing payload 120 may include a plurality of different tools 130 and robot arms 135 attached thereto. The robot arms 135 may move and acquire any number of tools 130 to interface with different subsystems, nozzles, interfaces, or the like on the Client satellite 110. For refueling, the robot arms 135 may be permanently affixed to the servicing payload 120 upon assembly, or may be removably attached at different times. The tools 130 may be placed at predetermined positions on the servicing payload 120 to enable the one or more robot arms 135 to access the tools 130.

The Client satellite 110 may be fitted with a FDV interface 140. The FDV interface 140 illustrated in FIG. 1 has three FDVs 140. Any number of FDV interfaces 140 may be provided on a particular satellite in order to support different media that may be required for the satellite to perform its mission objectives. The servicing mission/event may call upon the servicer to interface with and pass media through one or all of the outfitted FDVs. Embodiments described herein provide a QD apparatus and refueling tool configured to be used by a robot arm to re-fuel the Client satellite 110 and leave the Client satellite 110 in as close to launch condition as possible when it is released and redeployed into service.

The satellite servicing system 100 includes a plurality of tools for servicing a satellite and accessing the FDV interface 140. For example, a Client satellite 110 may be covered with a thermal blanket. One of the tools 130 on the servicing payload 120 may be used to remove the thermal blanket, which may entail cutting the thermal blanket and manipulating it out of the way. Once the thermal blanketing has been manipulated to reveal the FDV array, a series of caps which close out the FDV may be present; frequently these caps are affixed to the FDV with lockwire as a means of anti-backoff protection. The servicing payload 120 includes tools to remove a lock wire from the FDV. The FDV may include a tertiary cap, which is removed to reveal a secondary cap. Beneath the secondary cap resides a conical seal which ensures a leak-tight seal between the FDV and secondary cap. One or more of the tools 130 may be used to remove those elements. Before those tasks take place there is a tool on the servicing payload 120 that can grasp onto the Client satellite 110 such that the Client satellite 110 as a whole can be acquired and restrained in the appropriate orientation such that the FDV is accessible within the limits of reach of the robot arms 135. The Client satellite 110 may be restrained by the grasping tool for the duration of the servicing event or it may be pulled into a docking mechanism and berthed to the servicing payload 120 such that all robot arms 135 are available to assist with the individual servicing tasks.

A refueling tool (RT) 150 such as a hypergol refueling tool may be positioned at a location on the servicing payload 120. The QD apparatus 160 may be placed at another location or previously affixed to the RT 150. In one operating mode, the RT 150 may be attached to a robot arm 135. During operation, the robot arm 135 may move to and attach to the RT 150, disengaging it from the servicing payload 120. With the RT 150 mounted to the robot arm 135, the robot arm 135 may further move to, pick up, and attach the QD apparatus 160 thereto. This combination of tools attached to the robot arm 135 may then be used to connect to a FDV (illustrated in FIG. 2) at the FDV interface 140 to refuel the Client satellite 110. The robot arms 135 may be programmed to work independently without human intervention, or may be manipulated by a person stationed on a space vehicle or at a ground location.

Fuel for the Client satellite 110 may be passed through the robot arm 135, RT 150, and QD apparatus 160 into a FDV at the FDV interface 140 of the Client satellite 110. The fuel may be stored in a storage unit (not illustrated) in the servicing payload 120 or in further subassemblies attached to the servicing payload 120.

Figure 2:
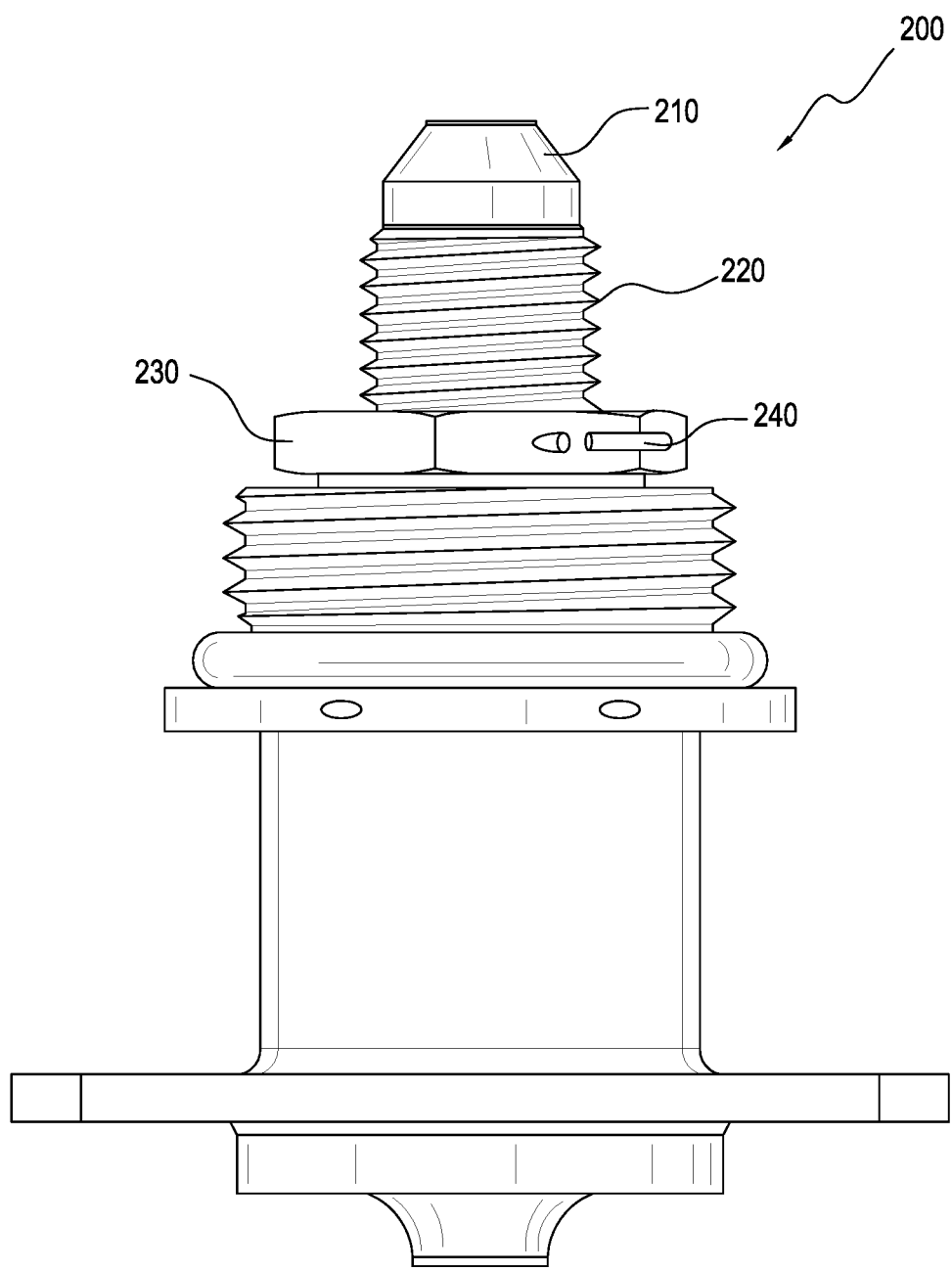
FIG. 2 illustrates a fill and drain valve in accordance with FIG. 1.

FIG. 2 illustrates a fill and drain valve (FDV) 200 in accordance with FIG. 1. The FDV 200 may include a fitting 210 and threads 220 such as a 37° Army-Navy (AN) or Joint Industry Council (JIC) hydraulic fitting which are designed to receive a standard hose found in ground refueling operations. The fitting 210 includes a plurality of threads 220. Disposed at one end of the threads 220 opposite the sealing surface of the fitting 210 is a rotary actuation nut 230 that may be used to open and close the sealing apparatus within the body of the FDV 200. During this rotary actuation, rotary actuation nut 230 may translates axially along an axis of the FDV 200, or it may transmit axial motion to internal components of the FDV 200.

The FDV 200 may also include a lock wire 240. The lock wire 240 may affix a portion of the rotary actuation nut 230 to some other portion of the FDV 200 that is stationary. One or more lock wires 240 may be used on most FDVs 200 as a way to prevent caps and rotary actuation nuts 230 from inadvertently loosening during vibrational and environmental loads experienced during launch and on-orbit operations, or due to unintentional actuation. Lock wires 240 may be severed or manipulated on FDVs 200 in order to establish access to the FDV 200 for transfer of propellant. After preparing an FDV 200 for refueling, FDVs 200 may have a remnant of lock wire 240 attached to the rotary actuation nut 230 or other feature of the valve. Embodiments described herein may also permit a cutting of the lock wire 240 when accessing the FDV 200, and removing them as a hindrance, or the embodiments may include features that allow for the proper interface to FDV 200 and actuation of the rotary actuation nut 230 even in the presence of wire remnants which, due to the microgravity environment, may assume any number of random orientations relative to the FDV 200.

Embodiments described herein provide for FDV 200 redundant seal leak protection. In the event that a primary seal of the FDV 200 cannot be sealed after refueling, a secondary means of sealing is provided. Secondary sealing is provided by a QD apparatus 160 (illustrated in FIG. 4) that engages the threads 220 of the Client FDV 200. The fitting 210 and threads 220 may be in the form of a standardized 37 degree, flared fitting end in accordance with SAE AS4395 to permit fuel transfer on the ground. The fitting 210 and threads 220 is connected to the QD apparatus 160 for refueling the Client satellite 110. In order to provide a proper seal, a load must be generated on the flared fitting of the FDV sealing surface 210 to create the seal. One way to generate this preload is to use the threads 220 on the FDV sealing surface 210 and threads 220.

Figure 3:
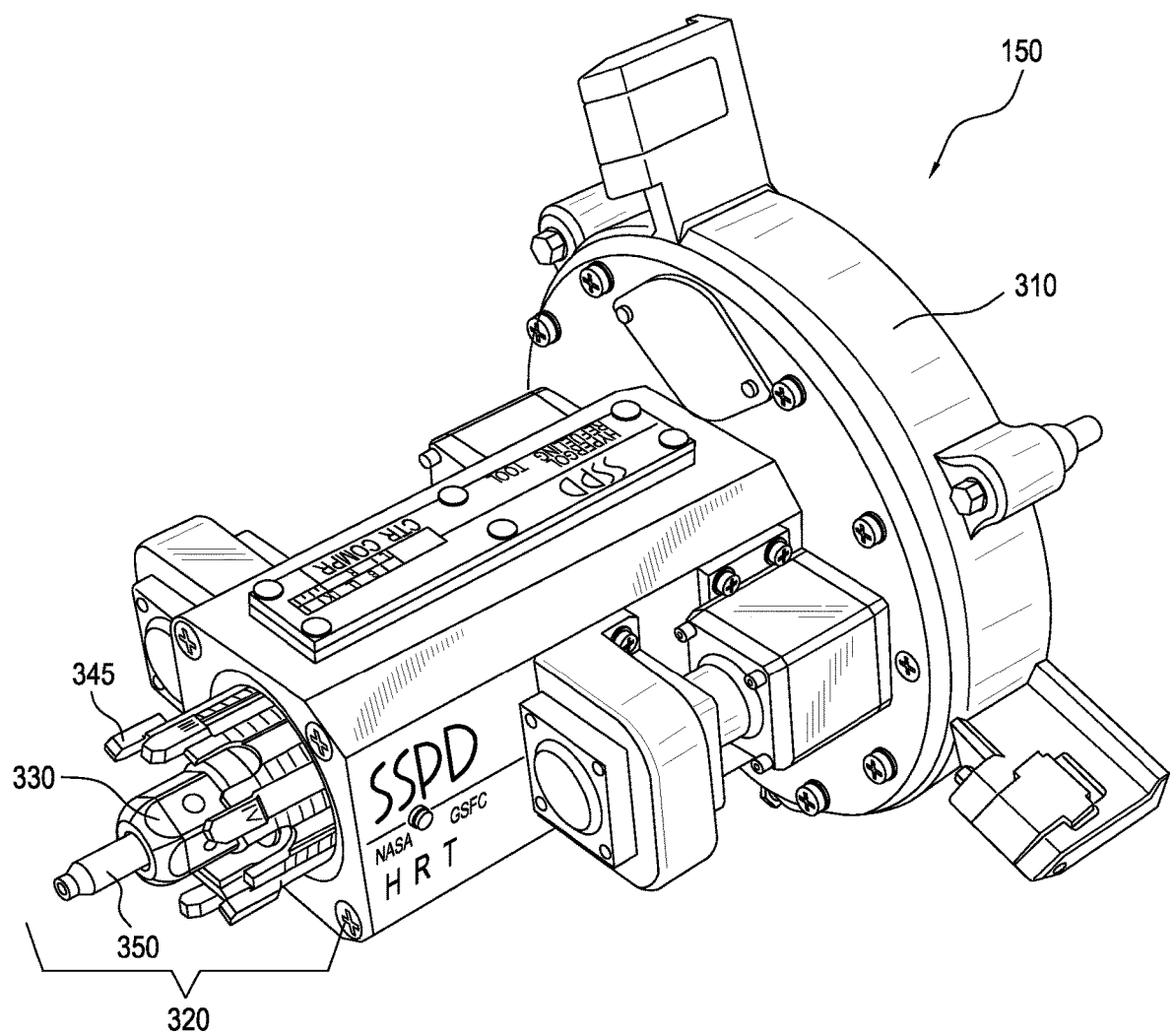
FIG. 3 illustrates a refueling tool (RT) in accordance with FIG. 1.

FIG. 3 illustrates a refueling tool (RT) 150 in accordance with FIG. 1. One end 310 of the RT 150 may attach to a robot arm 135 (illustrated in FIG. 1) and to fueling mechanisms connected through the servicing payload 120. Fuel delivery may occur through the connection to the robot arm 135 but may more likely be attached through a separate fitting on the exterior of the RT 150. In this way, mechanical and electrical services are provided to the RT 150 via the robot arm 135, and fluid delivery is provided through a separate propellant hose which is also part of the servicing payload 120. A front end assembly 320 of the RT 150 may include several components. The front end assembly 320 may include a hex drive 330. The hex drive 330 is a hexagonal apparatus extending from the front end assembly 320. The hex drive 330 may transfer torque from the robot arm 135 to a tail region 522 (illustrated in FIG. 5) of the QD in order to actuate features within the QD. Those skilled in the art will recognize that any number of polygonal forms other than a hexagon may be employed as a torque transmission feature. The hex drive 330 features a flange at its inboard end which is used to apply a substantially axial force to the QD in order to push split threads 510 (illustrated in FIG. 5) of the QD apparatus 160 onto the threads 220. The hex drive 330 may subsequently use the available robot torque to tighten the QD apparatus 160 onto the partially-acquired thread 220 of the FDV 200, thereby engaging the QD onto the sealing surface 210. In this way, the QD avoids cross-threading onto threads 220 and thereby prevents damage to the FDV. The front end assembly 320 may further include a spanner drive assembly that includes a plurality of spanner wedges 345. The spanner wedges 345 are configured to align with receiving notches 420 (illustrated in FIG. 4) of the QD apparatus 160 to engage the RT 150 with the QD apparatus 160 and provide an alternate, independent means of torque delivery to the QD in order to actuate additional features.

During installation of the QD apparatus 160 to the FDV 200, an inner shell of a poppet fitting subassembly 500 of the QD apparatus 160 (illustrated in FIG. 5) is rotated using the hex drive 330 of the RT 150. On the FDV 200 side of the QD apparatus 160, once the hex drive 330 has been rotated to a certain torque, a pre-load is developed between the sealing surface 210 and O-rings 560a and 560b (illustrated in FIG. 5). The sealing surface 210 seals with the O-rings 560a and 560b after the QD apparatus 160 is inserted over and tightened onto the sealing surface 210 and threads 220. On the RT 150 side of the QD apparatus 160, a fluid nozzle 350 on the RT 150 seals with O-rings 540a and 540b (illustrated in FIG. 5). Once the QD apparatus 160 is fully engaged to the FDV 200, the FDV 200 may be unlocked using the QD apparatus 160 acting as an actuator.

The RT 150 also includes a fluid nozzle 350 to pass fuel therethrough. Given different pressure requirements for different propellant systems, a set of nominal operating pressures have been determined according to embodiments described herein that encompass Client needs.

Figure 4:
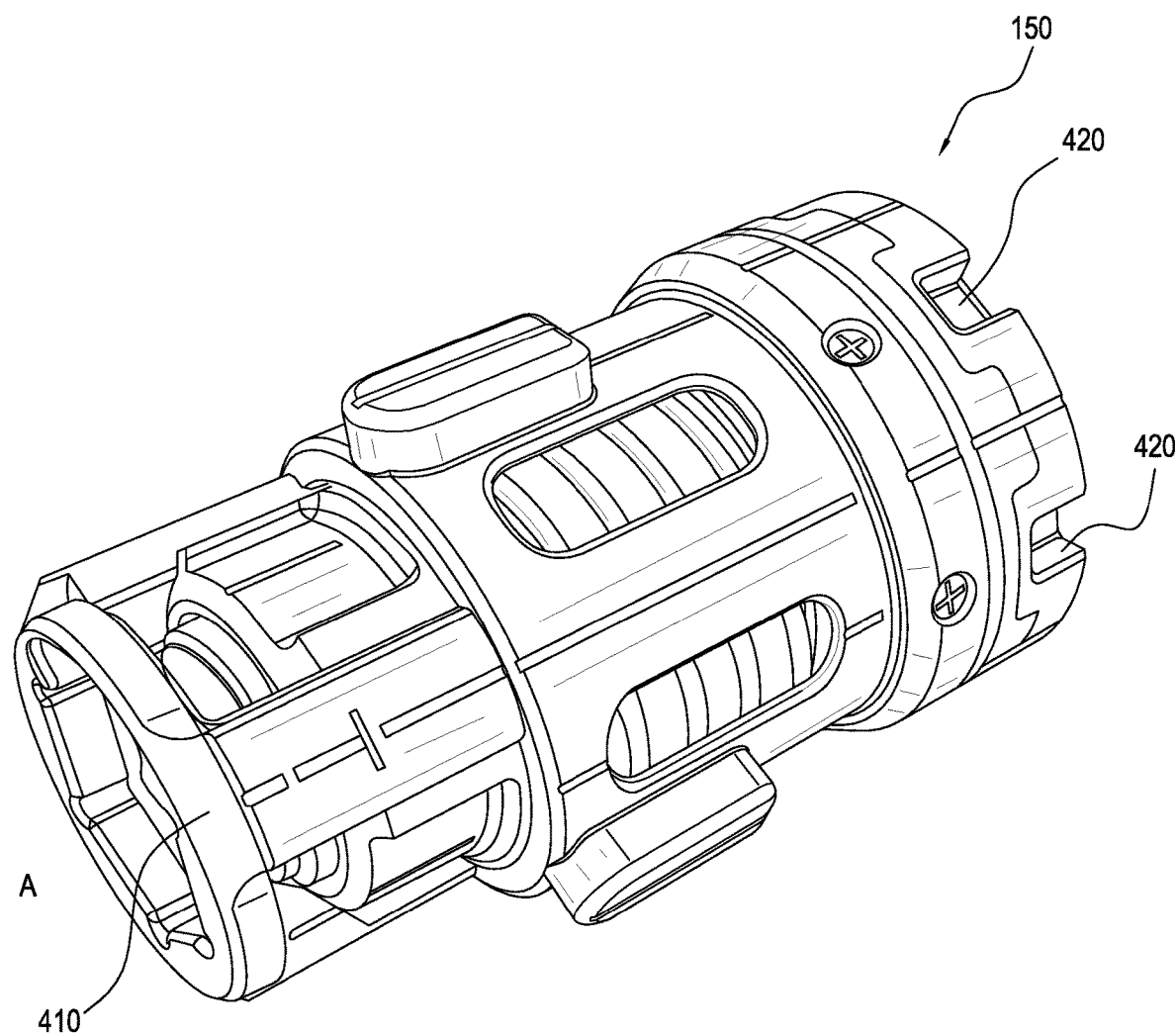
FIG. 4 illustrates a perspective view of the quick disconnect (QD) apparatus in accordance with FIG. 1.

FIG. 4 illustrates a perspective view of the quick disconnect (QD) apparatus 160 in accordance with FIG. 1. By using the QD apparatus 160 to attach to a FDV 200 of a Client satellite 110 at a first end "A," the operational life of a Client satellite 110 can be extended through on-orbit refueling of the satellite's one or more FDVs. In addition to providing a universal interface for various FDVs 200, the QD apparatus 160 adds additional sealant redundancy to the system to replace sealant caps that have been removed from the FDV 200 when accessing the FDV 200.

The QD apparatus 160 may include a hexagonal actuator 410. In combination with the RT 150, the QD apparatus 160 using the actuator 410 is able to open and close the FDV 200 via the rotary actuation nut 230. The actuator 410 is configured to interface to the rotary actuation nut 230 of the FDV 200. The actuator 410 includes a relief zone which accommodates any remnants of cut lock wire 240.

By way of tele-operated robotic actuation, embodiments described herein using the QD apparatus 160 may establish a seal to the Client FDV 200. The QD apparatus 160 may be used to open and close a rotary actuation nut 230 of a FDV 200. The QD apparatus 160 may also permit transfer of propellant from the servicing payload 120 on a servicing spacecraft to the Client spacecraft or Client satellite 110. In addition, the QD apparatus 160 in combination with the RT 150 is able to perform many tasks contemplated herein such as accommodate lock wire remnants, provide fault tolerance for an FDV seal, accommodate a MEOP of 600 psig for hypergols, provide media compatibility, provide a way to adapt to different FDV geometries, provide feedback for teleoperation, provide fault tolerance to release from Client satellites, provide propellant filtration, accommodate stowage, and provide a fault tolerant design for refueling mission reliability.

Figure 5:
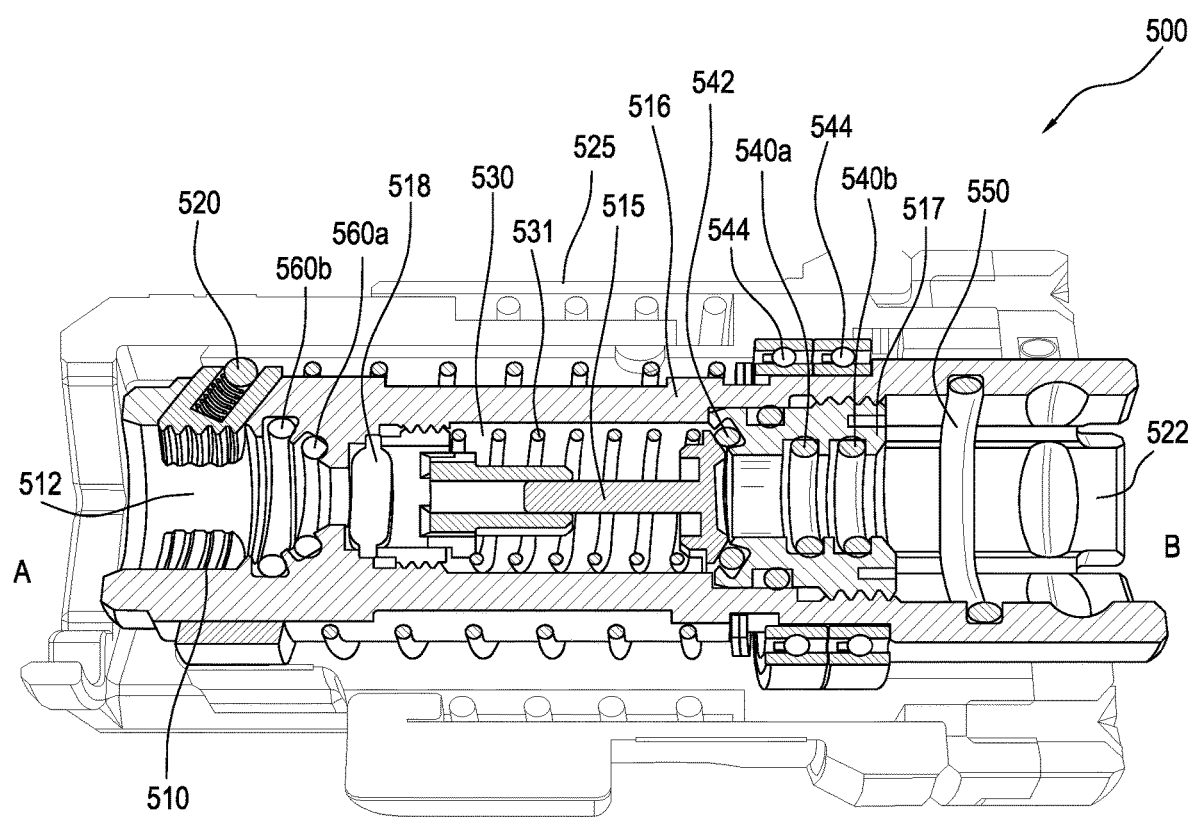
FIG. 5 illustrates a cross-sectional view of the poppet fitting subassembly of the QD apparatus in accordance with FIG. 4.

FIG. 5 illustrates a cross-sectional view of the poppet fitting subassembly 500 of the QD apparatus 160 in accordance with FIG. 4. The QD apparatus 160 has several components and features, including a shaded housing, actuator, and stowage sleeve 525 and a highlighted poppet fitting subassembly 500. With a robot arm 135 and robot control, cross-threading may be more prevalent than a human attempting to thread two components together, as a robot may not have the same tactile feel as a person. At the FDV end "A" of the poppet fitting subassembly 500 there is illustrated a split thread 510 embedded in a head region 512 of the QD apparatus 160. The split thread 510 is an intermittent thread around the head region 512 of the poppet fitting subassembly 500, and "splits" into difference sections, with sections of the head region 512 interspersed between sections of the split thread 510. Each thread element is able to articulate in a simultaneous radial and axial motion in order to allow the individual elements to articulate over the features of a male thread as the array is pushed onto the male thread in an axial direction, which eliminates the necessity of rotating the array to attach to the male thread.

The poppet fitting subassembly 500 may also include a hexagonally-shaped tail region 522 to receive the hex drive 330. When the QD apparatus 160 is attached to the RT 150 at side "B," the hex drive 330 of the RT 150 engages with the tail region 522 of the QD apparatus 160. Through this engagement the hex drive 330 rotates the poppet fitting subassembly 500, and thus rotates the QD apparatus 160 about the threads 220 of the FDV 200.

The split thread 510 of the QD apparatus 160 is configured to engage with the threads 220 proximal to the sealing surface 210 of the FDV 200. The split thread 510 may engage with the threads 220 in a plurality of ways. In a first manner, the split thread 510 may be threaded by the hex drive 330 of the RT 150 in a circular manner onto the threads 220, starting at a beginning of the thread section near the end "A." Once started at the beginning of the threads 220, the poppet fitting subassembly 500 and thus QD apparatus 160 will be wound around the FDV 200 until the QD apparatus 160 is screwed on and a seal is established. In one embodiment of the invention, an unthreaded portion of head region 512 features an internal diameter that closely matches the major diameter of the FDV threads 220; this section installs over a portion of the threads 220 prior to engagement of the QD threads 510, whereby the close fit to the thread 220 major diameter and length of engagement ensure proper non-cocked alignment of the QD apparatus 160 to the FDV 200. In this way, the QD apparatus 160 is equipped with an anti-cross-threading feature.

In a second manner, to prevent cross-threading that may occur, the QD apparatus 160 is configured to have a compression spring 520 within each of the split threads 510 that allows the split threads 510 to retract towards the housing, actuator, and stowage sleeve 525 of the QD apparatus 160 and move out of the way when timing of male and female thread helixes is mis-matched (i.e. during cross-threading) or as a response to non-rotary thread engagement (i.e. axial pushing of the split threads 510 over the FDV threads 220).

In the second manner, the array of split threads 510 is biased in the closed configuration by the compression springs 520. If the threads 220 of the nozzle of the FDV 200 and the split thread 510 cannot be aligned, a flange of the hex drive interfaces to the outside edge of the hex interface 522 and applies an axial load through this interface. An axial force is provide by motion of the robot arm. This pushing out by the robot arm will cause the split threads 510 to push against the threads 220 of the FDV 200. Because of the compression spring 520, the split threads 510 are movable and are able to retract as the head region 512 snaps onto the threads 220. The split-thread 510 will click over the threads 220 until the QD apparatus 160 is nearly fully seated. Then the QD apparatus 160 may be rotated by the hex drive 330 and locked to fully seat the QD apparatus 160 around the threads 220 and complete the seal.

As illustrated in FIG. 5, the split threads 510 may be disposed in multiple positions on the poppet fitting subassembly 500 of the QD apparatus 160. Split threads 510 are used to connect to FDV threads 220 in various places, but not around an entire periphery of the threads 220. This limited contact and gaps in the contact of the split threads 510 permits each split threads 510 to be pushed back using its included compression spring 520 in an independent manner, not as a monolith if the threads form one continuous body about the circumference. The split thread 510 is provided to prevent cross-threading and to prevent galling between threaded interfaces of the QD apparatus 160 and FDV 200. The split thread 510 design and snapping on of the head region 512 may also be used with damaged threads on a FDV 200. If there is a section of damage on the threads 220, one element in the array may be used to sufficiently affix the QD apparatus 160 to the FDV 200. The other threads can move out of the way and remain so disposed to clear the damage.

The poppet fitting subassembly 500 includes seals to replace the seals that are disengaged when the FDV 200 is opened. The QD apparatus 160 may include a poppet seal 517 including accommodations for primary and secondary nozzle seals 540a and 540b as well as a check valve ORing 542 and the O-rings 544 that seals the poppet seal 517 chassis to the rest of the poppet fitting subassembly 500. Despite being labeled primary and secondary seals, if either nozzle seal 540a or 540b fails, the other is there for backup. A middle section of the poppet fitting subassembly 500 is where the fluid nozzle 350 of the RT 150 interfaces with the QD apparatus 160. A primary seal location may be a connection point between the RT 150 and the QD apparatus 160. The poppet fitting subassembly 500 may further include a check valve 515. The check valve 515 may be a passive seal that includes the check valve O-ring 542.

The check valve 515 is disposed within the poppet fitting subassembly 500 in such a way that a conical surface on a check valve head 516 is maintained in substantially preloaded contact with an O-ring 542 within poppet seal 517 due to the action of a check valve spring 531. The arrangement of the check valve 515 is such that a back-pressure from the Client propulsion system acts in the same direction as the check valve spring 531, causing the check valve 515 to seal with greater authority should other elements of the Client propulsion be unable to maintain a full seal.

When the RT 150 is connected to the QD apparatus 160, the check-valve 515 becomes a secondary preventive measure to prevent the FDV 200 from leaking. If the primary seal of the FDV 200 is leaking, or not sealing correctly after the connection to the QD apparatus 160, the check valve 515 will prevent the fuel Hydrazine or the like from leaving the FDV 200. The poppet fitting subassembly 500 further includes a canted coil spring 550, which may prevent cross-contamination between the Client satellite 110, and the satellite housing the servicing platform 120. The canted coil spring 550 establishes an electrical ground path between the QD apparatus 160 and the RT hex drive 330 in order to normalize potential between the two. According to embodiments, a microfilter 518 may be included to aid in protecting the Client and servicing propellant systems from contaminants that can affect the various sealing surfaces and the purity of the propellant.

If one of the O-rings 560a or 560b fails when sealing on the AN fitting (sealing surface 210) of the FDV 200, the other O-ring 560b or 560a provides a backup. Embodiments described herein provide multiple redundancies at various points of connection. No leaks are permitted when the components are connected, and no leaks are permitted when fueling is complete and the QD apparatus 160 is sealed for later use.

Figure 6A:
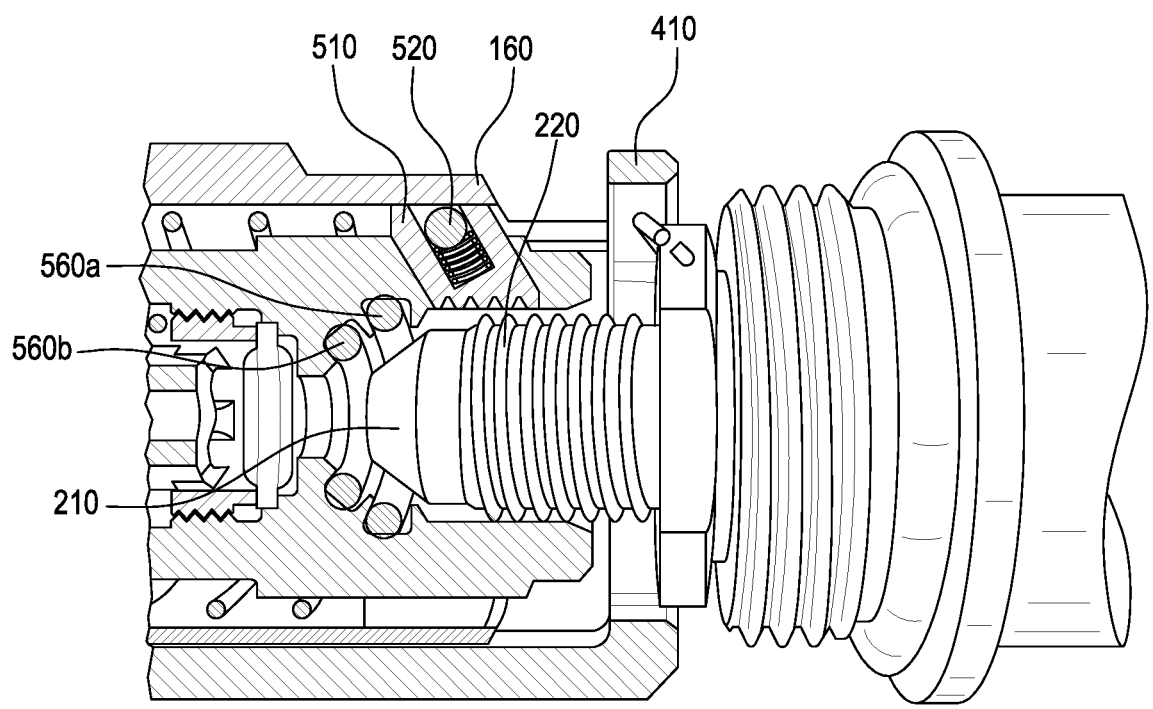
FIGS. 6A and 6B illustrate a method of connecting the QD apparatus to the fill and drain valve in accordance with embodiments described herein.
Figure 6B:
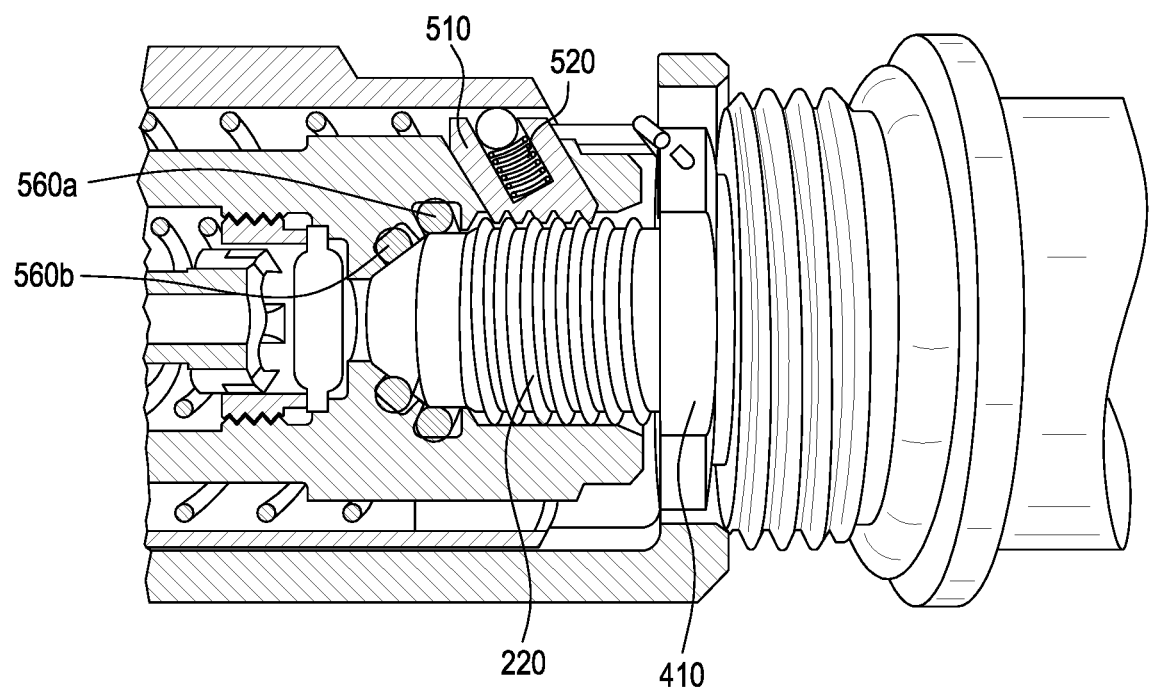

FIGS. 6A and 6B illustrate a method of connecting the QD apparatus to the fill and drain valve in accordance with embodiments described herein, particularly the split threads 510 snapping onto the FDV threads 220 by torque of the hex drive 330. As illustrated in FIG. 6A, when the QD apparatus 160 is being inserted onto the sealing surface 210 of the FDV 200, cross-threading may occur. At this point, FIG. 6B illustrates that the split thread 510 may be snapped onto the threads 220 of the FDV 200 using the torque from the hex drive 330, bypassing the initial threading operation. Once snapped on, the sealing surface 210 may be sealed by O-rings 560a and 560b of the QD apparatus 160 and the FDV 200 is ready for fueling.

Figure 7:
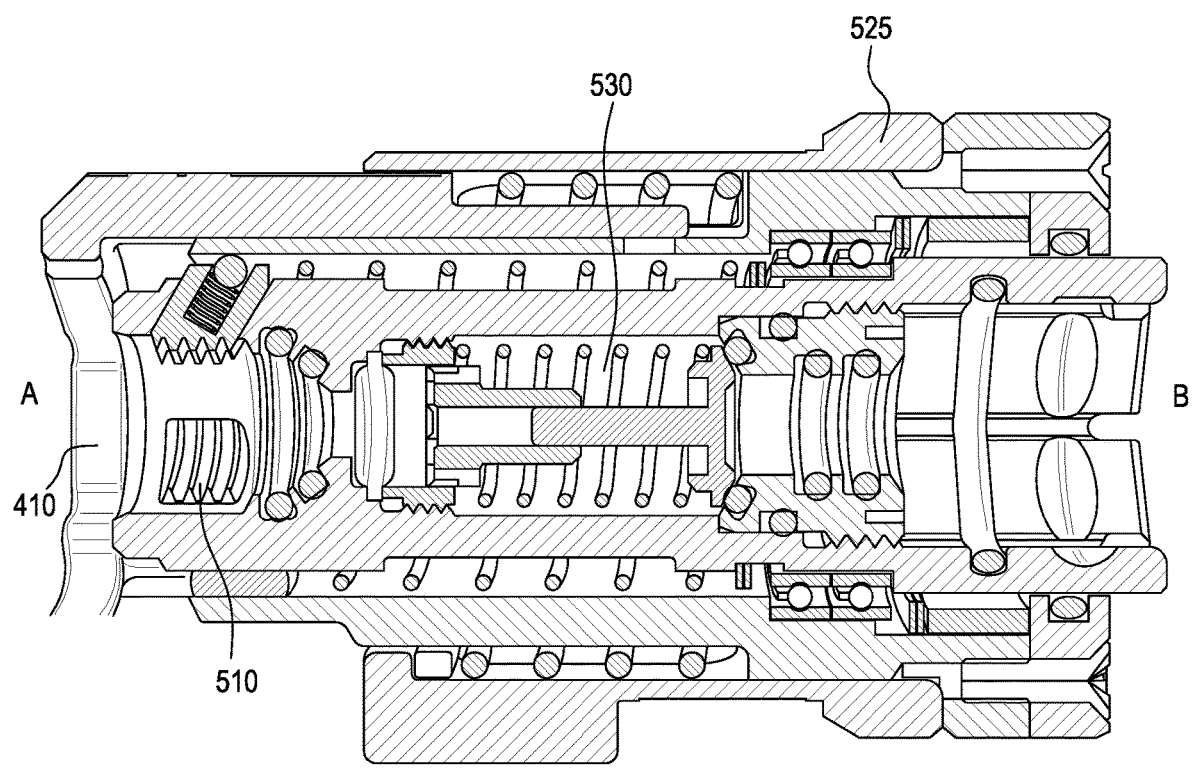
FIG. 7 illustrates a cross-sectional view of a complete QD apparatus including a housing, actuator, and stowage sleeve in accordance with FIG. 4.

FIG. 7 illustrates a cross-sectional view of a complete QD apparatus 160 including the housing, actuator, and stowage sleeve 525 in accordance with FIG. 4. The QD apparatus 160 seals onto the FDV 200 on side "A" thereof and seals onto the fluid nozzle 350 of the RT 150 on the side "B". The side A of the QD apparatus 160 features an actuator 410 which includes an internal hex feature that allows it to mate to, and transmit torque to, the rotary actuation nut 230 of the FDV 200. The side B of the QD apparatus 160 using the tail region 522 is keyed for the hex drive 330 of the RT 150. The hex drive 330 of the RT 150 is rotated and/or pushed to engage the split threads 510 of the QD apparatus 160 onto the threads 220 of the FDV 200. The spanner wedges 345 of the RT 150 are rotated to rotate the actuator 410 of the QD apparatus 160 and thus rotate the rotary actuation nut 230 of the FDV 200 to open or close the valve and permit refueling of a Client satellite 110.

The QD apparatus 160 may have a conduit 530 for propellant transfer. The conduit 530 may transfer fuel between a servicer propellant transfer system in the RT 150, through the QD apparatus 160, and into the Client side propellant system in the Client satellite 110.

The QD apparatus 160 may use adaptable architecture. Different Client satellites 110 use different dimensioned FDVs 200, having unique forms and operations. The QD apparatus 160 is designed for a refueling tool system that can accommodate multiple satellite FDV interfaces.

Robotic tele-operation may be used to connect the QD apparatus 160 to an FDV 200, and to dispose of the QD apparatus 160 leaving it connected to a satellite FDV 200. One problem in the industry is that non-cooperative satellite servicing currently requires tasks to be remotely actuated by human operators controlling robots. This imposes requirements on tools used during those tasks to communicate information properly back to the operators to enable proper execution of the task. Described herein, robotic operations also include unique compliance and functional capability to permit robotic usefulness.

Embodiments described herein include dealing with situations in which there is an inability to detach from a Client. A risk in any servicing task performed on a non-cooperative satellite is the inability to release from the Client satellite any portion of the servicer QD apparatus 160 in combination with the RT 150 that is engaged to the Client.

As illustrated in FIG. 7, the housing, actuator, and stowage sleeve 525 may transmit torque from the spanner wedges 345 to the rotary actuation nut 230 the actuator 410. The QD apparatus 160 may be on a set of springs, so that a robot operator may merely be concerned with lining up the sealing surface 210 to the split threads 510. As described herein, the split threads 510 may screw or click onto the threads 220 of the FDV 200. Once QD apparatuses 160 are threaded on to the FDV sealing surface 210, the housing, actuator, and stowage sleeve 525 may be rotated and the QD apparatus 160 will snap onto the FDV 200 if the two were misaligned. If the alignment is true, the split threads 510 may be threaded around the nozzle. For alignment or misalignment, a step may be taken by the operator to align the center stem tail region 522 of the QD apparatus 160 to the hex drive 330. Once the tail region 522 is aligned and the seals are made, the spanner drive assembly using the spanner wedges 345 interface is used to open and close the retainer of the FDV 200 using the actuator 410.

The various seals of the QD apparatus 160 may be called inhibits. Thus, according to embodiments described herein, at least one inhibit is put in place to replace seals taken from the FDV 200 during initial accessing thereof. The QD apparatus is single-fault tolerant against inadvertent release of propellant while a refueling operation is taking place, and remains single-fault tolerant to inadvertent release of propellant once the FDV 200 is closed.

A primary seal exists on the FDV 200. When the caps are removed, two inhibits are removed. The FDV 200 is left with one inhibit, a metal seal. Most FDVs 200 have one method of preventing a leak of a primary cap and a tertiary cap. These caps are removed when accessing the FDV 200. The QD apparatus 160 provides additional seals such that if the seal on the FDV 200 leaks, the QD apparatus 160 will catch that leak and prevent fuel from leaking into space.

FIG. 6 illustrates a connection between an FDV 200 and QD apparatus 160 in accordance with embodiments described herein. When the FDV 200 is open, the O-rings 560a and 560b provide seals for the sealing surface 210. There are two O-ring seals and one leak path. Thus when sealing, the system is single-fault tolerant. Second, the system is single-fault tolerant when the FDV is closed, and a seal is provided by the nozzle seals 540a and 540b.

The RT 150 may be used with many tools other than the QD apparatus 160. A front end of the RT 150 may be swapped out with different interfaces. The RT 150 may transfer torques from an end effector of the RT 150 to the QD apparatus 160. Additional work may be performed by the QD apparatus 160 that connects to a FDV 200.

Figure 8A:
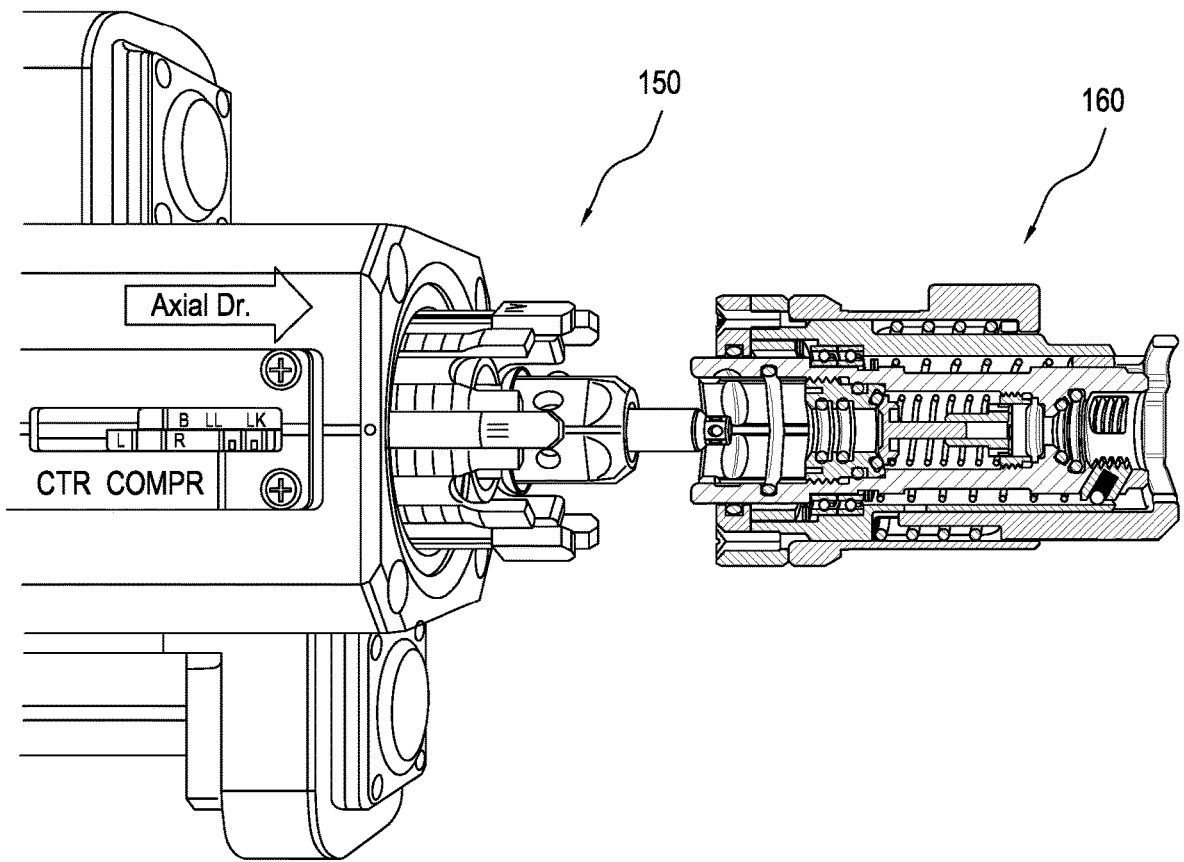
FIG. 8A illustrates the RT connecting with the QD apparatus in accordance with embodiments described herein.

FIG. 8A illustrates the RT 150 connecting with the QD apparatus 160. When the RT 150 is engaged, the two O-rings 560a and 560b of the QD apparatus 160 engage the RT sealing surface 210. The fluid nozzle 350 of the RT 150 also pushes open the check valve 515. In that way the check valve 515 is moved out of the way fuel can move from the RT 150 through the check valve 515, out of vent ports and out to where the QD apparatus 160 would connect to the FDV 200.

Figure 8B:
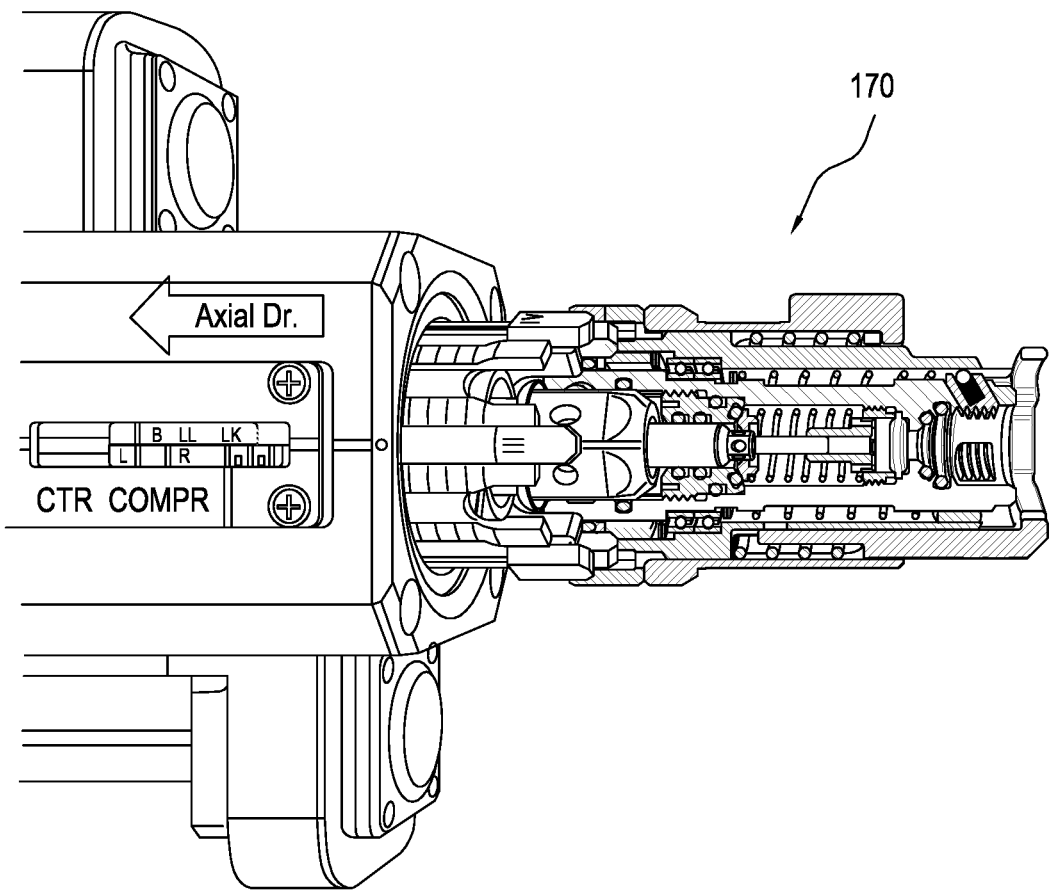
FIG. 8B illustrates the interior of the QD apparatus when the RT is connected thereto in accordance with embodiments described herein.

FIG. 8B illustrates the interior of the QD apparatus 160 when the RT 150 is connected thereto, creating a RT-QD tool 170. FIG. 8B illustrates a combination tool including the RT 150 and QD apparatus 160 which may be referred to an RT-QD tool 170. The RT-QD tool 170 can be used in the delivery or receipt of media. The RT-QD tool 170 addresses a desire to be able to refuel a satellite onorbit as a means of extending the satellite's operational life. The RT-QD tool 170 has features to seal with and manipulate a satellite FDV 200. A flexible hose mated to the RT 150 of the tool 170 permits media transfer to a Client satellite 110 when the FDV 200 is open. The RT 150 architecture may be such that it provides coaxial, cooperative features capable of interfacing with a QD apparatus 160. Utilizing the two external pinion drives, the RT 150 transfers the torques delivered by the ATDS 2.0 offset drives to a front drive assembly of the RT 150, where it interfaces with and actuates the QD apparatus 160. A front drive assembly of the RT 150 may provide rotary motion for tool adapters (not illustrated) and is configured to utilize a ball detente lock to capture the tool adapters. The RT 150 may include a fluid entry port to receive fuel and a fluid nozzle 350 to dispense fuel through the QD apparatus 160 to a Client assembly. The architecture allows the fluid entry port to remain centered on the QD apparatus 160, passing the fluid nozzle 350 through the two coaxial drives of the QD apparatus 160 and into the QD apparatus 160. As discussed herein, the term refuel is used to mean the resupply of propellant and required pressurants or other media that allow a satellite with depleted fuel stores to extend its life. The QD apparatus 160 may be used with other tools in addition to the RT 150.

Figure 9A:
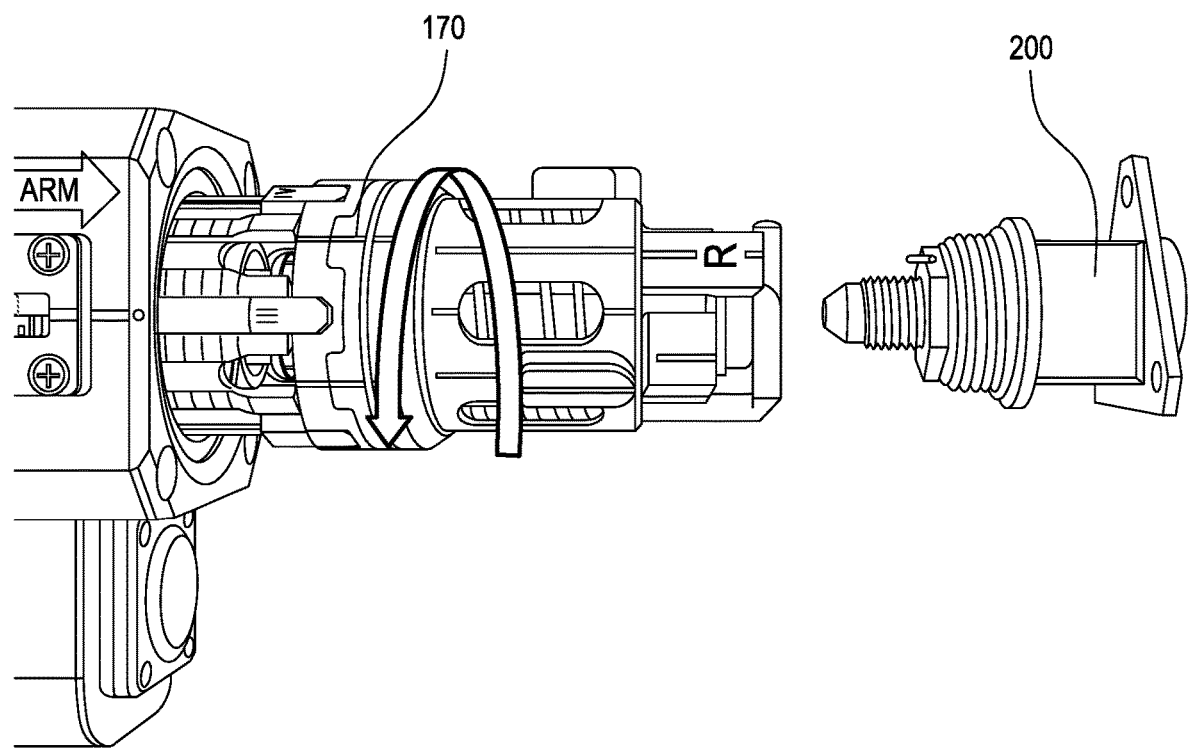
FIG. 9A illustrates the RT-QD to be connected to an FDV in accordance with embodiments described herein.
Figure 9B:
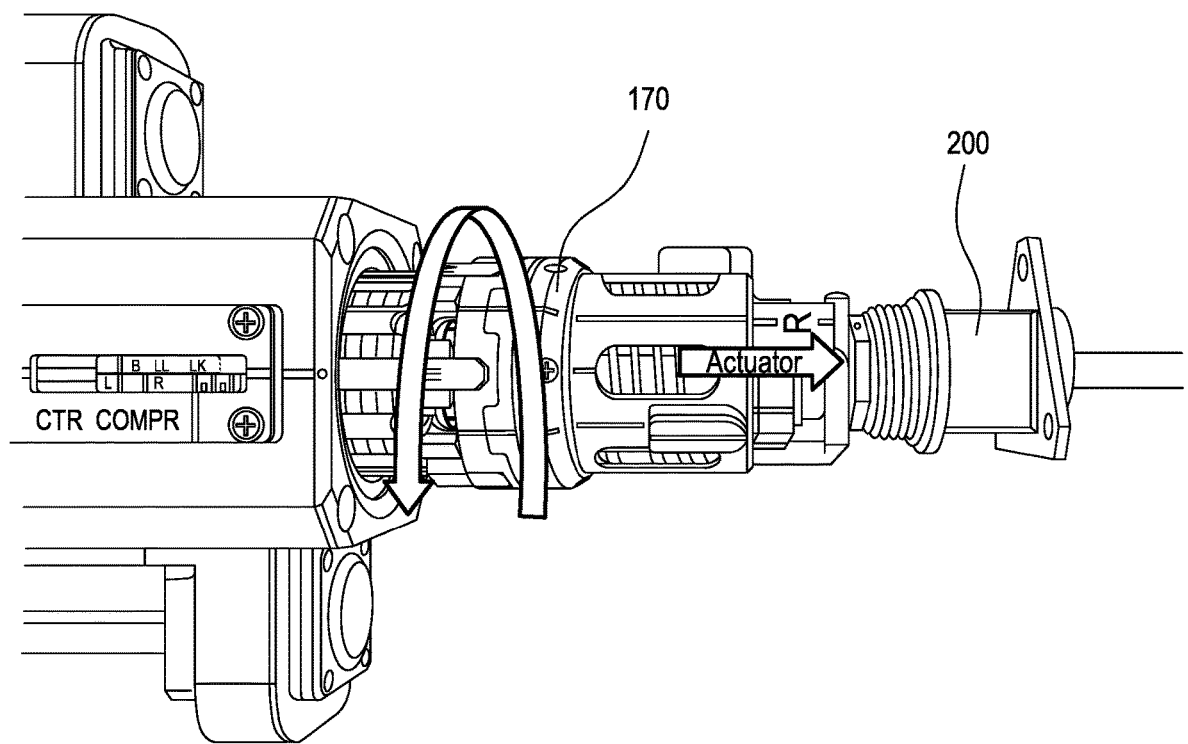
FIG. 9B illustrates the RT-QD connecting to the FDV in accordance with embodiments described herein.

FIG. 9A illustrates the RT-QD 170 to be connected to an FDV 200 in accordance with embodiments described herein. FIG. 9B illustrates a connection of the system. The QD apparatus 160 with the RT 150 is engaged and FDV 200 is engaged.

Operations of the system may include several steps. During an initial step on a servicing platform 120, a RT 150 may be retrieved from storage by a robot arm 135. The QD apparatus 160 may be retrieved from a receptacle and engaged to the RT 150. The QD apparatus 160 may be translated to a worksite and coupled to a FDV 200. The FDV retainer is then engaged with the QD apparatus 160. Leak checks of the RT 150 to the QD apparatus 160 and to the FDV 200 may be performed. Then the QD apparatus 160 may be actuated by the RT 150 to open the FDV 200, and a fuel transfer may be performed. To close, Actuate the QD apparatus 160 may be actuated by the RT 150 to close the FDV 200. The RT 150 may then be withdrawn from the QD apparatus 160 and returned to stowage. The QD apparatus 160 will remain connected to the FDV 200 for future use.

Embodiments described herein provide sufficient sealing between attached components. Described herein, an RT 150 is attached to the QD apparatus 160. This combined structure of the RT-QD tool 170 is joined to the FDV 200 of a Client satellite 110 to refuel the Client assembly. The coupling of these different mechanical mechanisms uses proper seal apparatuses and techniques to prevent the leakage of fuel not only into the various components, but into the space realm as well. Seals will be maintained during FDV separation and re-attachment of the QD apparatus 160. Actuation including opening, closing, and fluid transfer is provided. After FDV 200 closure, a tools and tool drive subsystem on the servicing platform 120 (TTDS) may seal the FDV 200 primary fluid path from flowing to an exterior environment. The system described herein may set a threshold leak rate for on orbit operation.

Figure 10A:
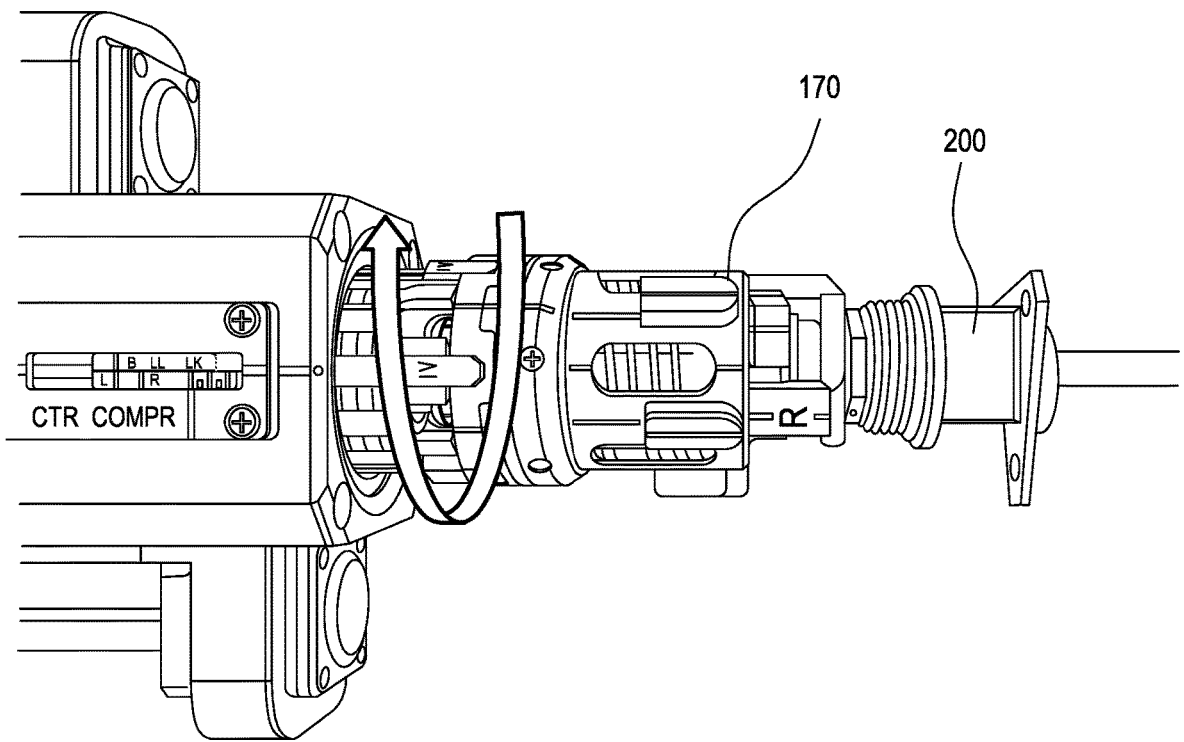
FIG. 10A illustrates the RT-QD connected to the FDV in accordance with embodiments described herein.
Figure 10B:
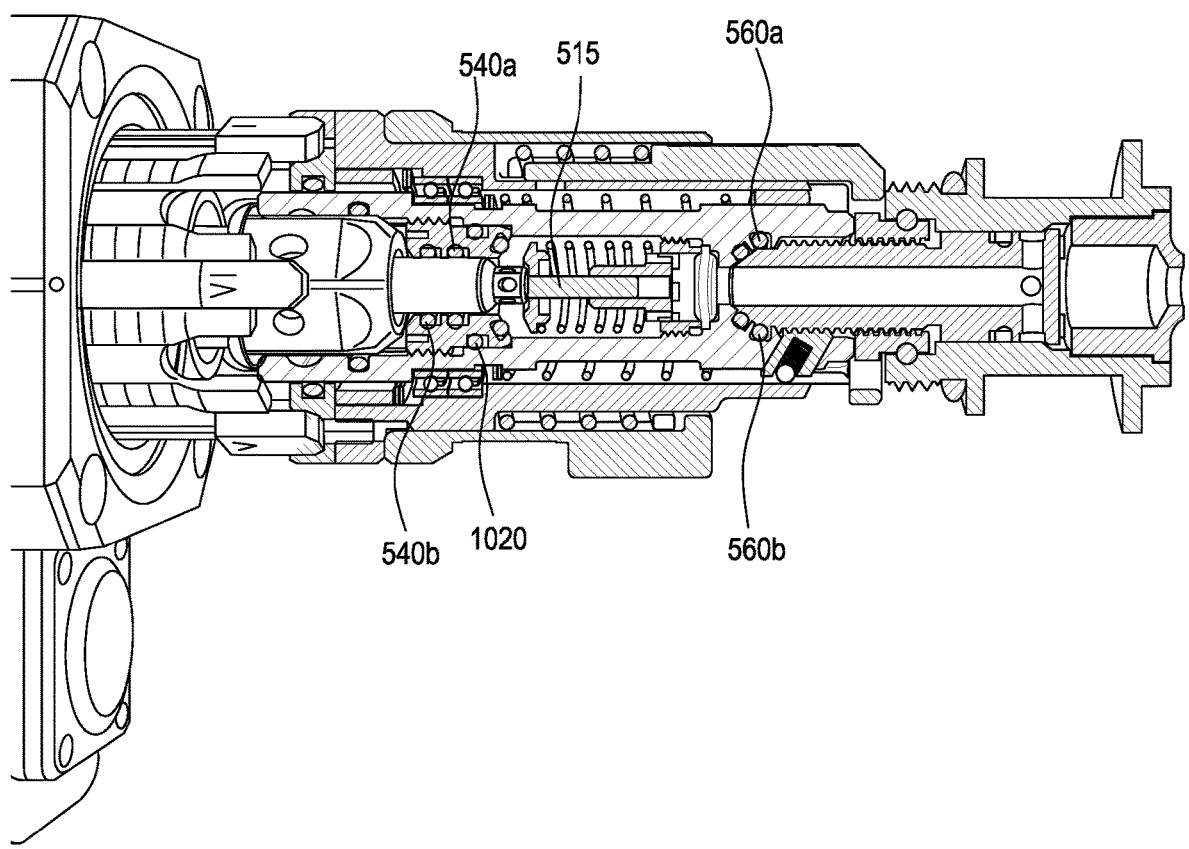
FIG. 10B illustrates primary and secondary seals of the quick disconnect apparatus when the RT-QD is connected to the FDV.

FIG. 10A illustrates the RT-QD connected to the FDV in accordance with embodiments described herein. FIG. 10B illustrates primary and secondary seals of the quick disconnect apparatus when the RT-QD is connected to the FDV. Primary seals include O-ring 560a, and one of the nozzle seals 540a, and an additional internal seal 1020. Secondary seals include O-ring 560b and nozzle seal 540b.

A tele-robotic interface is discussed herein using a robot arm 135 designed for the noncooperative/legacy interface of a Client satellite 110. The RT-QD 170 accesses the FDV 200 on a Client satellite 110. A legacy FDV 200 does not have to be cut off or have a hole bored through it. An existing interface is used that was never designed to be robotically operated. Embodiments described herein include an adapter that interacts with the FDV interface 140 so that it can be used robotically. The QD apparatus 160 provides redundancies once the QD apparatus 160 has been left behind to replace the removed redundancies of the FDV 200. The two layers removed from the FDV 200 are primarily ground safety requirements because fuels used in space operations may be hazardous. Ground safety protocol requires two verifiable barriers beyond the primary means of fluid retention in order to prevent fuel from leaking on the ground. Once in orbit, embodiments described herein provide a single-fault tolerance, or one layer of redundancy, to prevent mission failure.

The refueling system described herein may be designed to have a useful life before parts and components lose some reliability. Thus, refueling tool cycles including the TTDS may be designed for at least three on-orbit hose and nozzle deployments and Client connect sequences. Embodiments may provide for excess fluid evacuation. The TTDS is configured to evacuate any remaining working fluid between the refueling tool tip and a PTS solenoid after closure of the target valve.

The refueling tool and Quick Disconnect architecture described herein has taken into consideration several changes over time. Embodiments described herein have removed consumables from a refueling tool and placed them in the QD apparatus 160, hence they are disposable in the sense that they may be left attached to the Client assembly after refueling. A QD apparatus 160 as described herein may be designed and optimized for specific FDVs. As described herein, a check-valve is included in the QD apparatus 160 structure to aid in the leave-behind seal capability. Thus the QD apparatus 160 structure may be used with universal refueling tools and varying Client FDVs. The QD apparatus 160 is light-weight, and uses a split thread mechanism to attach to the FDV. Novel structures and methods are described to address mounting issues such as cross-threading on a FDV thread.

Embodiments discuss a refueling task fault tolerance. The refueling architecture may include fault tolerance for completion of the refueling task.

Although the various examples of one embodiment have been described in detail with particular reference to certain exemplary aspects thereof, it should be understood that embodiments described herein are capable of other embodiments and its details are capable of modifications in various obvious respects. As is readily apparent to those skilled in the art, variations and modifications can be affected while remaining within the spirit and scope of the embodiments. Accordingly, the foregoing disclosure, description, and figures are for illustrative purposes only and do not in any way limit the embodiments, which is defined only by the claims.

The invention claimed is:

1. A combination satellite, refueling spacecraft and a quick disconnect apparatus facilitating a removable connection there between, said combination comprising:
  a legacy fill drain valve permanently mounted to said satellite;

a refueling tool operably mounted to said refueling spacecraft; and said quick connect apparatus having:
- a first end configured to interface with and removably connected to said legacy fill and drain valve (FDV) of a satellite to be serviced;
- a second end configured to interface with and removably connected to said refueling tool; and
- a middle portion including at least one redundant seal to prevent unwanted fuel transfer during connection of the FDV and refueling tool;

wherein said quick disconnect apparatus is adapted to remain sealingly connected to said FDV after refueling and after it is disconnected from said refueling tool to thereby convert said FDV into a cooperative servicing interface in order to facilitate additional servicing events in the future.

2. The quick disconnect apparatus of claim 1, comprising a split thread adjacent the first end threadably coupled to a fitting of the FDV.

3. The quick disconnect apparatus of claim 2, comprising a plurality of O-ring seals adjacent the first end.

4. The quick disconnect apparatus of claim 3, comprising a check valve to interact with a nozzle of the refueling tool.

5. The quick disconnect apparatus of claim 4, comprising a plurality a poppet seals between the check valve and the second end.

6. The quick disconnect apparatus of claim 5, comprising a retainer interface at the first end to connect to a rotary actuation nut of the FDV.

7. The quick disconnect apparatus of claim 6, comprising a tail region at the second end configured to connect to a hex drive of the refueling tool.

8. A method of refueling an on-orbit legacy satellite, comprising:
- providing a refueling spacecraft proximate said on-orbit legacy satellite, said refueling spacecraft having a refueling tool connected to a robot arm;
- removably and sealingly connecting a quick disconnect (QD) apparatus to the refueling tool;
- sealingly connecting the QD apparatus to a legacy fuel drain valve (FDV) of said on-orbit legacy satellite;
- refueling the legacy satellite through the robot arm; and
- disconnecting said quick connect apparatus from said refueling tool after refueling to remain sealingly connected to said FDV to thereby convert said FDV into a cooperative servicing interface in order to facilitate additional servicing events in the future.

9. The method of claim 8, further comprising removing at least one seal from the FDV before connecting the QD apparatus to the FDV.

* * * * *